US012596072B2

(12) United States Patent (10) Patent No.: US 12,596,072 B2
Hulme et al. (45) Date of Patent: Apr. 7, 2026

(54) FLUORIMETER CELL AND ITS CALIBRATION

(71) Applicant: STARNA SCIENTIFIC LTD, Essex (GB)

(72) Inventors: Keith Hulme, Essex (GB); Nathan Hulme, Essex (GB); Rory Gardner, Essex (GB)

(73) Assignee: STARNA SCIENTIFIC LTD, Essex (GB)

( * ) Notice: Subject to any disclaimer, the term of this patent is extended or adjusted under 35 U.S.C. 154(b) by 23 days.

(21) Appl. No.: 18/043,865

(22) PCT Filed: Sep. 8, 2021

(86) PCT No.: PCT/EP2021/074737
§ 371 (c)(1),
(2) Date: Mar. 2, 2023

(87) PCT Pub. No.: WO2022/053533
PCT Pub. Date: Mar. 17, 2022

(65) Prior Publication Data
US 2023/0258566 A1 Aug. 17, 2023

(30) Foreign Application Priority Data
Sep. 8, 2020 (GB) ..................................... 2014108

(51) Int. Cl.
*G01N 21/64* (2006.01)
*G01N 21/27* (2006.01)

(52) U.S. Cl.
CPC ......... *G01N 21/645* (2013.01); *G01N 21/278* (2013.01)

(58) Field of Classification Search
CPC ........................... G01N 21/278; G01N 21/645
See application file for complete search history.

(56) References Cited

U.S. PATENT DOCUMENTS 3,944,834 A 3/1976 Chuan et al.
5,108,179 A * 4/1992 Myers .................. G01N 21/645
356/417
(Continued)

FOREIGN PATENT DOCUMENTS

WO 00/17627 A1 3/2000

OTHER PUBLICATIONS

United Kingdom Intellectual Property Office, Search Report issued in corresponding Application No. GB2014108.1 dated Feb. 15, 2021.
(Continued)

*Primary Examiner* — Hina F Ayub
(74) *Attorney, Agent, or Firm* — Stites & Harbison, PLLC; David W. Nagle, Jr.; Gary N. Stewart

(57) ABSTRACT

A fluorimeter reference cell comprising a rare earth salt solution or other optically transparent solution with a well-defined and characteristic absorbance pattern which material emits an absorption spectrum when an excitation light is incident upon it. The absorption spectrum has a defined characteristic enabling wavelength calibration of the fluorimeter. The reference cell comprises a second material, a light scattering colloid such as colloidal silica. The dispersive properties result in the absorption spectrum being scattered or reflected at an angle to the angle of incidence of the excitation light incident on the reference cell.

6 Claims, 1 Drawing Sheet

(56) References Cited

U.S. PATENT DOCUMENTS

| | | | |
|---|---|---|---|
| 2003/0180183 A1* | 9/2003 | Fukuoka | C12Q 1/28 422/400 |
| 2005/0287040 A1 | 12/2005 | Giebeler et al. | |
| 2008/0190861 A1* | 8/2008 | Branning | C02F 1/5236 210/728 |
| 2008/0314114 A1 | 12/2008 | Feke et al. | |
| 2010/0243876 A1 | 9/2010 | Resch-Genger et al. | |
| 2017/0315057 A1* | 11/2017 | Kovriguine | G01N 33/487 |
| 2022/0011229 A1* | 1/2022 | Qiu | G01N 21/645 |

OTHER PUBLICATIONS

United Kingdom Intellectual Property Office, Examination Report issued in corresponding Application No. GB2014108.1 dated Jun. 6, 2024.

United Kingdom Intellectual Property Office, Examination Report issued in corresponding Application No. GB2014108.1 dated Nov. 8, 2024.

United Kingdom Intellectual Property Office, Examination Report issued in corresponding Application No. GB2014108.1 dated Mar. 26, 2025.

United Kingdom Intellectual Property Office, Intention to Grant issued in corresponding Application No. GB2014108.1 dated Nov. 17, 2025.

* cited by examiner

31

21

12

11

10

FLUORIMETER CELL AND ITS CALIBRATION

The invention relates to a fluorimeter reference material and its use in calibration of spectrofluorimetry instruments.

Wavelength calibration of monochromator based spectrofluorimeters is traditionally achieved through measuring the position of the atomic lines of the excitation lamp or a noble gas/mercury pen light in the sample position.

When calibrating the wavelength accuracy of the excitation monochromator the position of the main atomic line of the Xenon excitation source at 467.3 nm may be measured. This is a single wavelength calibration; this method does not validate the entire spectrum of the monochromator. Validation in this context means that the measurements provide wide-ranging and documented evidence that the instrument is functioning precisely and is distinct from calibration.

When calibrating the wavelength accuracy of the emission monochromator, the atomic lines of a calibrated light source in the form of a mercury, Krypton or Neon pen lamp may be used. These calibrated light sources provide emission lines across the visible and NIR spectrum but are generally relatively expensive, require frequent calibration and the use of a diffuse reflector setup.

Some instrument manufacturers therefore recommend the use of a well-characterised reference solution such as Holmium oxide in perchloric acid typically used for wavelength accuracy validation in absorbance spectroscopy, coupled with a reflector. The reflector is placed in the sample position and the holmium solution is placed in the path of the excitation beam. A synchronous scan with $\Delta\lambda=0$ nm (i.e. the excitation and emission monochromators are set to the same position and moved at the same rate across the spectrum) or either the excitation or emission monochromator is set to zero order (i.e. the monochromator acts as a mirror and reflects all wavelengths of light) and the other monochromator is scanned across the spectrum.

This creates a projection of the holmium absorbance spectrum which is reflected off the surface of the reflector and into the detector.

This method works well with any optically transparent chemical solution or material which has sharply defined and/or well characterised absorbance spectra and allows determination of the accuracy of both the excitation and emission monochromators simultaneously.

A reflector or light scatterer is required in the sample position because a fluorescence spectrometer will have the detector oriented perpendicular or otherwise adjacent to the light source, rather than opposite the sample compartment as in transmission spectroscopy.

Many solutions can be provided in traceable/certified format, are mentioned in various pharmacopeia standards and can therefore be used to provide wavelength validation across the UV, visible and Near-IR spectrum. The main downsides to this methodology is that both a reference solution and a reflector are required as well as generally requiring a bespoke holder for each instrument type in order to keep the solution cell in the correct position in the excitation beam.

An alternative methodology places a layer of wavelength accuracy standard between a fluorescent material that displays a broad band of fluorescence when excited over a particular wavelength range and the detector. The fluorescence emission is attenuated by the absorption properties of wavelength accuracy standard. This method only validates the emission monochromator and can only be used over a range where the absorption of the standard and the emission of the fluorescent material overlap.

Examples of these approaches can be seen in US2005287040A1 and US2010243876A1

The known methods are relatively time consuming to perform and require a certain expertise to undertake accurately.

The present invention therefore seeks to provide new means for calibrating a fluorimeter that are easier and more convenient to use.

According to the invention there is provided a fluorimeter reference cell comprising a first material, which first material emits an absorption spectrum when an excitation light is incident upon the first material, which absorption spectrum has a defined characteristic enabling wavelength calibration of the fluorimeter, wherein the reference cell further comprises a second material, which second material has dispersive properties such that the absorption spectrum is scattered or reflected at an angle to the angle of incidence of the excitation light incident on the reference cell.

Preferred aspects of the invention can be found in the sub-claims.

The invention advantageously provides an integrated, convenient, single part reference cell for utilising a projected image of the well-defined and characterised absorbance spectra of a rare-earths or other solution typically used for wavelength accuracy validation in absorbance spectroscopy.

The invention advantageously provides a single reference unit which can fit into the standard cuvette holder of a conventional spectrofluorimeter which comprises both the wavelength accuracy reference solution and a reflector in a single part.

Exemplary embodiments of the invention will now be described in greater detail with reference to the drawings in which.

Figure 1:
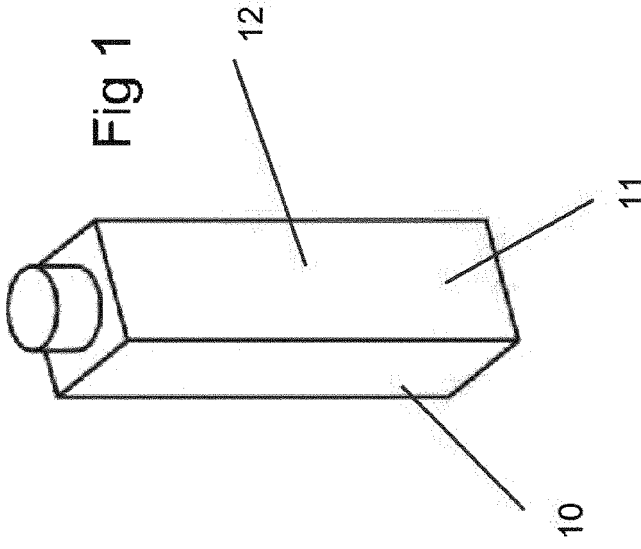
FIG. 1 shows a first embodiment of the invention

FIG. 1 shows a first embodiment of the invention comprising a standard quartz fluorimeter cell in a spectrofluorimeter 10, which cell is filled with a solution 11 typically used for wavelength accuracy validation in absorbance spectroscopy. An exemplary solution is holmium oxide in a 10% v/v perchloric acid solution. A small amount of colloidal silica or other stable, light scattering colloid 12 is doped into the rare earth solution in order to provide a scattering effect. The concentration of colloidal silica can be adjusted to suit instruments of different sensitivity, the concentration is relative to the sensitivity of the apparatus the reference material is being used to validate with sensitivity instruments requiring very small amounts of colloid. The cell is then permanently sealed.

In use, incident excitation light is absorbed at specific wavelengths by the solution and a projection of the absorbance spectrum is scattered by the suspended colloid particles into the detector which is typically located at 90° or otherwise adjacent to the incident excitation light.

Figure 2:
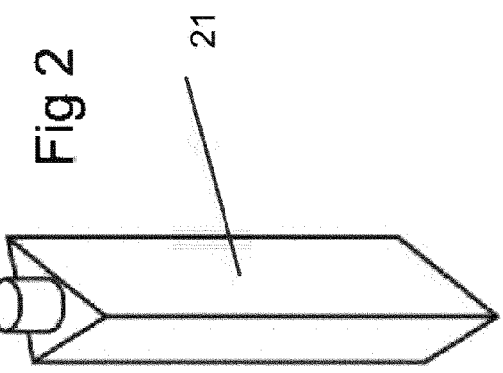
FIG. 2 shows a second embodiment of the invention

FIG. 2 shows a second embodiment in which a triangular fluorimeter cell has one side (usually the hypotenuse side) ground to a diffuse finish and/or is coated with a reflective coating. The total reflectivity of the diffuse/coated side can be adjusted to suit the specific sensitivity of the instrument to be validated.

This customised cell is then filled with a solution 21 typically used for wavelength accuracy validation in absorbance spectroscopy such as holmium oxide in perchloric acid. The cell is then permanently sealed.

Excitation light energy enters the cell through one of the adjacent sides of the cell and is absorbed at specific wavelengths by the solution. A projection of the absorbance spectrum is scattered or reflected by the coating/finish of the modified face into the instrument detector, usually located at 90° to the incident light.

Figure 3:
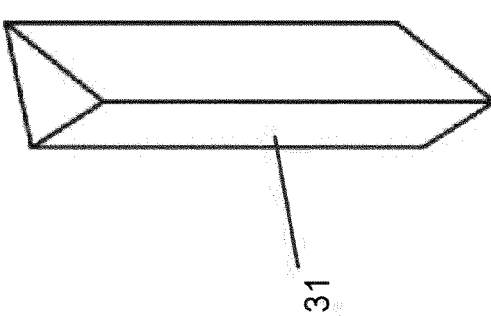
FIG. 3 shows a third embodiment of the invention

FIG. 3 relates to a third embodiment of the invention in which a triangular block 31 of a rare earth or other glass used typically for wavelength accuracy validation in absorbance spectroscopy has one side (usually the hypotenuse face) either ground to diffuse finish and/or is coated with a reflective coating. The total reflectivity of the modified side can be adjusted to suit the specific sensitivity of the instrument to be validated Excitation light energy enters the block through one of the adjacent faces and is absorbed at specific wavelengths by the glass. A projection of the absorbance spectrum is scattered or reflected by the coating/finish of the modified face into the instrument detector.

The embodiments of the invention are useful as a wavelength validation and/or calibration standard in any scanning spectrofluorimeter capable of collecting synchronous scans or setting monochromators to zero order. The above embodiments can be used as supplied, without the need for additional adaptors or holders in the prior art. They are further suitable for scanning spectrofluorimeters that measure at a right-angle or front-face sample geometry Certification measurements defining the wavelength positions of the absorption peaks of the solution can be generated by a reference spectrophotometer. The excitation and/or emission monochromators of a scanning spectrofluorimeter may be considered out of calibration if the wavelength positions of the peaks in the transmission spectrum are not at the same position as the certified values given in the certificate for the reference solution.

In addition to the specifically described holmium oxide solutions, alternatives having well defined absorption spectra both as glasses or solutions suitable for wavelength calibration in this manner include, but are not limited to:

Cerium Oxide for wavelength ranges 200-270 nm
Holmium Oxide for wavelength ranges of 240-650 nm
Didymium Oxide for wavelength ranges of 290-870 nm
Samarium Oxide for wavelength ranges of 230-560 nm
Holmium Glass Didymium Glass The wavelength accuracy solution/glass does not exhibit fluorescence of its own and the measured spectra is purely a reflection of the excitation beam attenuated at certain wavelengths by the solution/glass.

Although the invention has been specifically described in relation to a spectrofluorimeter, it would be applicable in other types of fluorimeter such as a filter fluorimeter.

The invention claimed is:

1. A fluorimeter reference cell (10) comprising a first material, which first material emits an absorption spectrum when an excitation light is incident upon the first material (11) in a fluorimeter, which absorption spectrum has a defined characteristic enabling wavelength calibration of the fluorimeter, wherein the reference cell further comprises a second material (12,21,31), which second material has dispersive properties such that the absorption spectrum is scattered or reflected at an angle to the angle of incidence of the excitation light incident on the reference cell into a detector of the fluorimeter located at 90° to the incident light.

2. The fluorimeter reference cell according to claim 1, wherein the reference cell comprises a quartz cell, containing the first material which comprises a rare earth salt solution or other optically transparent solution with a well-defined and characteristic absorbance pattern and the second material comprises a light scattering colloid.

3. The fluorimeter reference cell according to claim 1, wherein the reference cell has a triangular cross-section having a wall having a surface ground to a diffuse finish and/or is coated with a reflective coating, which surface is adapted to scatter or reflect light at an angle to the angle of incidence of the excitation light incident on the reference cell.

4. The fluorimeter reference cell according to claim 3, wherein the scattering is only provided by the surface coating.

5. The fluorimeter reference cell according to claim 1, wherein the first material is a rare earth glass or other optically transparent solid-state-material with a well-defined and characteristic absorbance spectrum.

6. The fluorimeter reference cell according to claim 1, wherein the second material comprises colloidal silica.

* * * * *